United States Patent
Burkart et al.

(10) Patent No.: US 7,370,340 B2
(45) Date of Patent: May 6, 2008

(54) RECORDING AND/OR REPRODUCTION APPARATUS FOR OPTICAL RECORDING MEDIA WITH MEANS FOR PARALLEL ORIENTATION OF THE SCANNING DEVICE WITH RESPECT TO THE SURFACE OF THE RECORDING MEDIUM

(75) Inventors: Harald Burkart, VS-Schwenningen (DE); Rolf Dupper, Villingen-Schwenningen (DE)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 10/582,036

(22) PCT Filed: Nov. 26, 2004

(86) PCT No.: PCT/EP2004/013507

§ 371 (c)(1),
(2), (4) Date: Jun. 7, 2006

(87) PCT Pub. No.: WO2005/059905

PCT Pub. Date: Jun. 30, 2005

(65) Prior Publication Data

US 2007/0083879 A1    Apr. 12, 2007

(30) Foreign Application Priority Data

Dec. 11, 2003    (DE)    ............... 103 58 254

(51) Int. Cl.
*G11B 7/08*    (2006.01)
(52) U.S. Cl. .................................. 720/675
(58) Field of Classification Search ............. 360/267.7, 360/267.8; 369/223, 249, 263; 720/674, 720/675
See application file for complete search history.

(56) References Cited

U.S. PATENT DOCUMENTS 5,933,407 A    8/1999    Watanabe et al.

(Continued)

FOREIGN PATENT DOCUMENTS

| JP | 8-87849 | 4/1996 |
|----|---------|--------|
| JP | 2001-6184 | 1/2001 |
| JP | 2003-91945 | 3/2003 |

OTHER PUBLICATIONS

Patent Abstracts of Japan, vol. 2003, No. 07, Jul. 3, 3003 & JP 2003-091945 (See Ref. AD).

(Continued)

*Primary Examiner*—Tianjie Chen
(74) *Attorney, Agent, or Firm*—Joseph J. Laks; Harvey D. Fried; Patricia Verlangieri

(57) ABSTRACT

The invention relates to a recording and/or reproduction apparatus for optical recording media with means for parallel orientation of the scanning device with respect to the surface of the recording medium, the scanning device being arranged on a slide that is guided on a guide rod. A tensioning element is provided, by means of which the guide rod of the scanning device is fixed on a baseplate in order to avoid a force transmission leading to the bending of the guide rod, said force transmission disadvantageously issuing from fixing or adjusting means of the guide rod, in an adjustable manner in a plane corresponding to the cross section of the guide rod. The fixing and adjusting device formed by means of the tensioning element has a small number of individual parts, the guide rod can be mounted on a shaped portion of the baseplate with a low outlay and nevertheless avoids to the greatest possible extent a force transmission to the guide rod that disadvantageously issues from fixing or adjusting means. The fixing an adjusting device is provided in particular for parallel orientation of the scanning device in a recording or reproduction apparatus for optical recording media with respect to the surface of the recording medium.

9 Claims, 8 Drawing Sheets

U.S. PATENT DOCUMENTS

Figure 1:
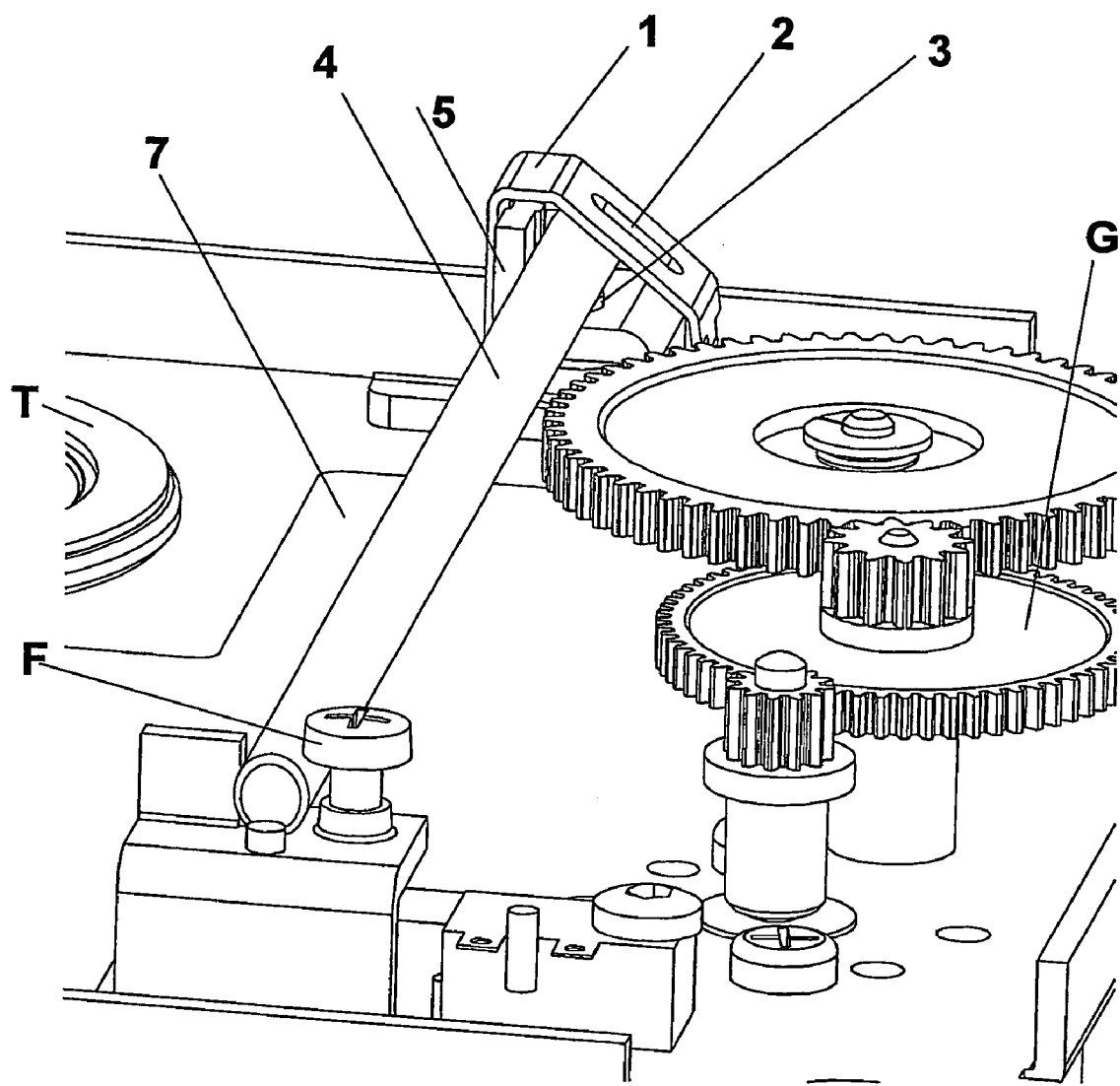

| | | |
|---|---|---|
| 5,982,735 A | 11/1999 | Tsai |
| 6,285,649 B1* | 9/2001 | Bessho et al. .............. 720/675 |
| 2001/0022772 A1* | 9/2001 | Moriyama .................. 369/249 |
| 2001/0048656 A1* | 12/2001 | Furukawa et al. .......... 369/219 |
| 2002/0075787 A1* | 6/2002 | Inoue et al. ................ 369/249 |
| 2002/0186646 A1* | 12/2002 | Akiba ........................ 369/249 |
| 2003/0012118 A1 | 1/2003 | Su et al. |
| 2003/0081534 A1* | 5/2003 | Omori ........................ 369/263 |
| 2004/0008609 A1* | 1/2004 | Fujibayashi et al. ........ 369/249 |
| 2004/0027962 A1* | 2/2004 | Kabasawa .................. 369/75.2 |

OTHER PUBLICATIONS

Patent Abstracts of Japan, vol. 1996, No. 08, Aug. 30, 1996 & JP 08-087849 (See Ref. AE).

Patent Abstracts of Japan, vol. 2000, No. 16, May 8, 2001 & JP 2001-006184 (See Ref. AF).

Search Report Dated Apr. 14, 2005.

* cited by examiner

RECORDING AND/OR REPRODUCTION APPARATUS FOR OPTICAL RECORDING MEDIA WITH MEANS FOR PARALLEL ORIENTATION OF THE SCANNING DEVICE WITH RESPECT TO THE SURFACE OF THE RECORDING MEDIUM

This application claims the benefit, under 35 U.S.C. § 365 of International Application PCT/EP04/013507, filed Nov. 26, 2004, which was published in accordance with PCT Article 21(2) on Jun. 30, 2005 in English and which claims the benefit of German patent application No. 10358254.1, filed Dec. 11, 2003.

The invention relates to a recording and/or reproduction apparatus for optical recording media with means for parallel orientation of the scanning device with respect to the surface of the recording medium, the scanning device being arranged on a slide that is guided by means of a guide rod. For fixing the guide rod, a fixing and adjusting arrangement is provided which avoids to the greatest possible extent a force transmission to the guide rod that disadvantageously issues from the fixing or adjusting means.

Examples of optical recording and/or reproduction apparatuses are CD or DVD players and corresponding recorders that are equipped by means of an optical scanning device, a so-called pick-up, to read data from an optical recording medium or to write data to the recording medium. The light beam, a laser beam, that reads the data of an optical recording medium or writes data to the optical recording medium is guided and focused on the track of the optical recording medium and has to be oriented perpendicularly with respect to the surface of the recording medium for optimum recording or reproduction of information. In order to be able to scan the entire recording and/or reproduction region of the recording medium, the optical scanning device is generally arranged on a slide that is moved parallel to the surface of the recording medium. In order to ensure a parallel guidance between recording medium and scanning device, it is already known to orient the motor of the disc turntable that receives the recording medium with respect to the direction of movement of the slide or the guide rod of the slide parallel to the surface of the recording medium. The parallel orientation or the adjustment of the guide rod of the slide with respect to the surface of the recording medium can advantageously be carried out with greater sensitivity or greater accuracy on account of the greater spacing of the clamping locations of the guide rod and with respect to the axis of rotation of the recording medium. However, it is disadvantageous that additional means are needed to prevent forces that are necessary for the fixing and adjustment of the guide rod and lead to bending of the guide rod from being transmitted to the guide rod.

Therefore, it is an object of the invention to provide means for parallel orientation of the scanning device with respect to the surface of the recording medium which require a low outlay and nevertheless avoid to the greatest possible extent a force transmission to the guide rod that disadvantageously issues from fixing or adjusting means.

This object is achieved by means of the features specified in independent claims. Advantageous refinements are specified in dependent claims.

One aspect of the invention is to specify means for fixing and adjusting the guide rod of the slide of an optical scanning device in a recording and/or reproduction apparatus for optical recording media which require a low outlay and nevertheless do not transmit to the guide rod forces which are necessary for the fixing and adjustment of the guide rod. The stress-free fixing and adjustment of the guide rod of the optical scanning device is necessary particularly on account of the high accuracy with which optical recording media, such as CD, DVD or Blu-Disc, have to be scanned. For illustration purposes, it shall be mentioned that the track spacing of a DVD in accordance with the ECMA-267 Standard is just 0.74 μm and a shaft 80 mm long with a diameter of 3 mm has a flexure of 43 μm in the case of a force of 15 N acting in the end region at a distance of 3 mm. Therefore, use is made, for example, of stress-free fixing and adjusting devices which comprise at least one end element that receives the guide rod in a stress-free manner and can be adjusted in a stress-free manner by means of a screw and a spring. Such end elements disadvantageously require a high outlay both with regard to mounting and the number of individual parts.

In order that a force transmission to the guide rod of an optical scanning device that disadvantageously issues from fixing or adjusting means is nevertheless avoided to the greatest possible extent with a low outlay, provision is made of a fixing and adjusting arrangement comprising a tensioning element and an adjusting screw, which fix the guide rod on a shaped portion of the baseplate in an adjustable manner in a plane corresponding to the cross section of the guide rod. The tensioning element, which is formed from a leaf spring, for example, wraps around the shaped portion of the baseplate and fixes the guide rod adjustably on the shaped portion of the baseplate. A tensioning element formed from a leaf spring has a bead that is arranged symmetrically and at an angle with respect to the adjusting direction of the adjusting screw that is provided for adjusting the guide rod. The angle at which the bead is arranged with respect to the adjusting direction of the adjusting screw is formed by a chamfer of the tensioning element formed in desk-like fashion. The fact that the bead of the tensioning element is arranged symmetrically and at an angle with respect to the adjusting direction of the adjusting screw means that, in a plane corresponding to the cross section of the guide rod, a linear fixing of the guide rod is achieved, thereby avoiding to the greatest possible extent a disadvantageous force transmission to the guide rod that leads to the bending of the guide rod.

The tensioning element's bead, which touches the guide rod tangentially, ensures a punctiform or linear fixing of the guide rod in the adjusting region of the guide rod. The bead, the adjusting screw and, if appropriate, a rib of the shaped portion of the baseplate are arranged in such a way that they form, in a plane corresponding to the cross section of the guide rod, a three-point fixing of the guide rod which avoids to the greatest possible extent the occurrence of bending forces issuing from the fixing of the guide rod.

The tensioning element can be mounted, as a spring element that wraps around the shaped portion of the baseplate and fixes the guide rod in an adjustable manner, on the shaped portion of the baseplate with a low outlay.

For the orientation of the tensioning element and in order to ensure that the guide rod is fixed in an adjustable manner in a plane corresponding to the cross section of the guide rod, the tensioning element has a lug that engages into a cutout of the shaped portion for the purpose of preventing the tensioning element from being shifted. The shaped portion of the baseplate is provided as an angular piece, one limb of which receives the adjusting screw and the other limb of which forms a rib, for example, on which the guide rod is guided in the adjusting direction.

The fixing and adjusting device requires a small number of individual parts and the mounting of the guide rod also requires a low outlay.

Figure 2:
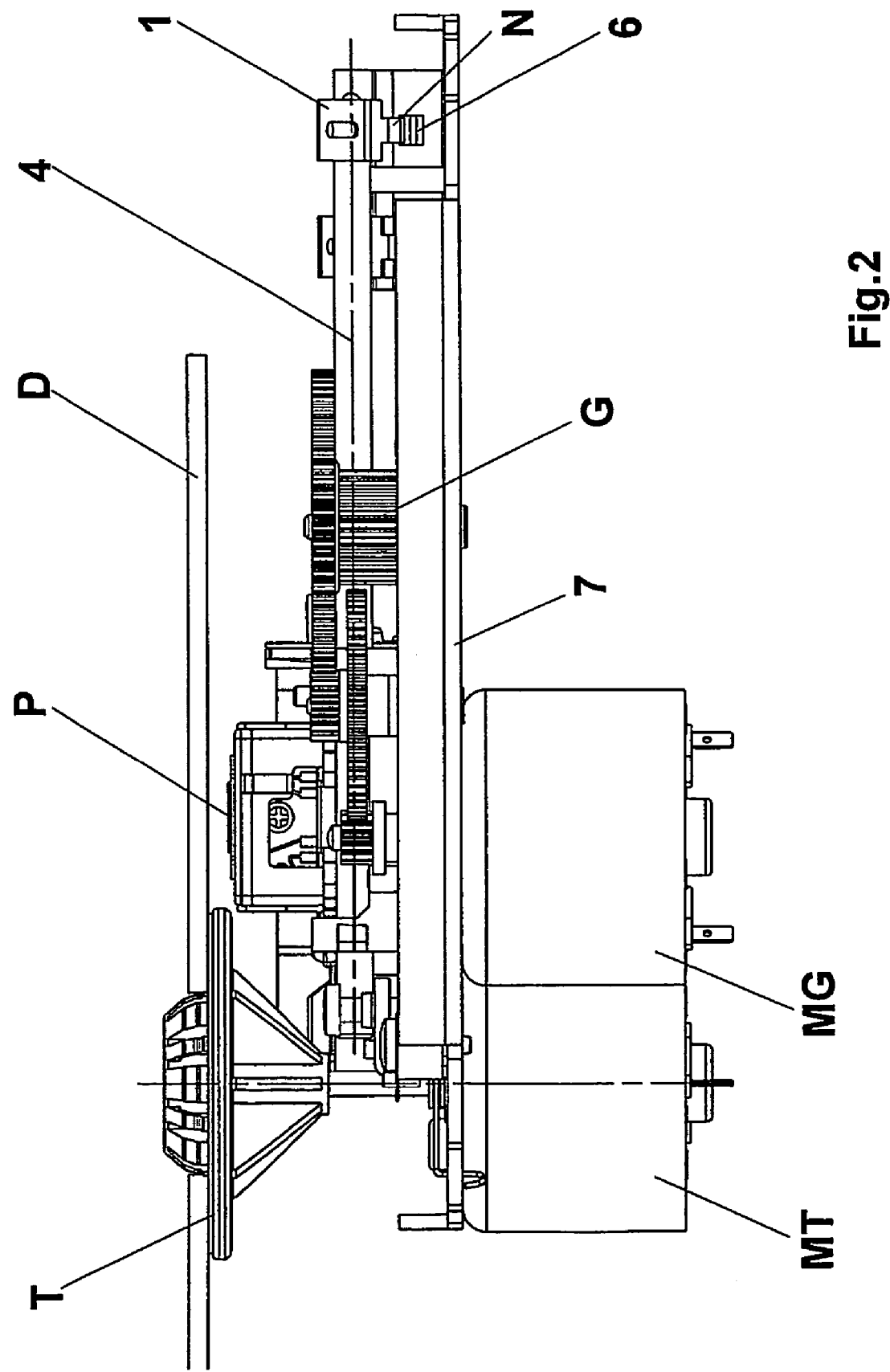
Figure 3:
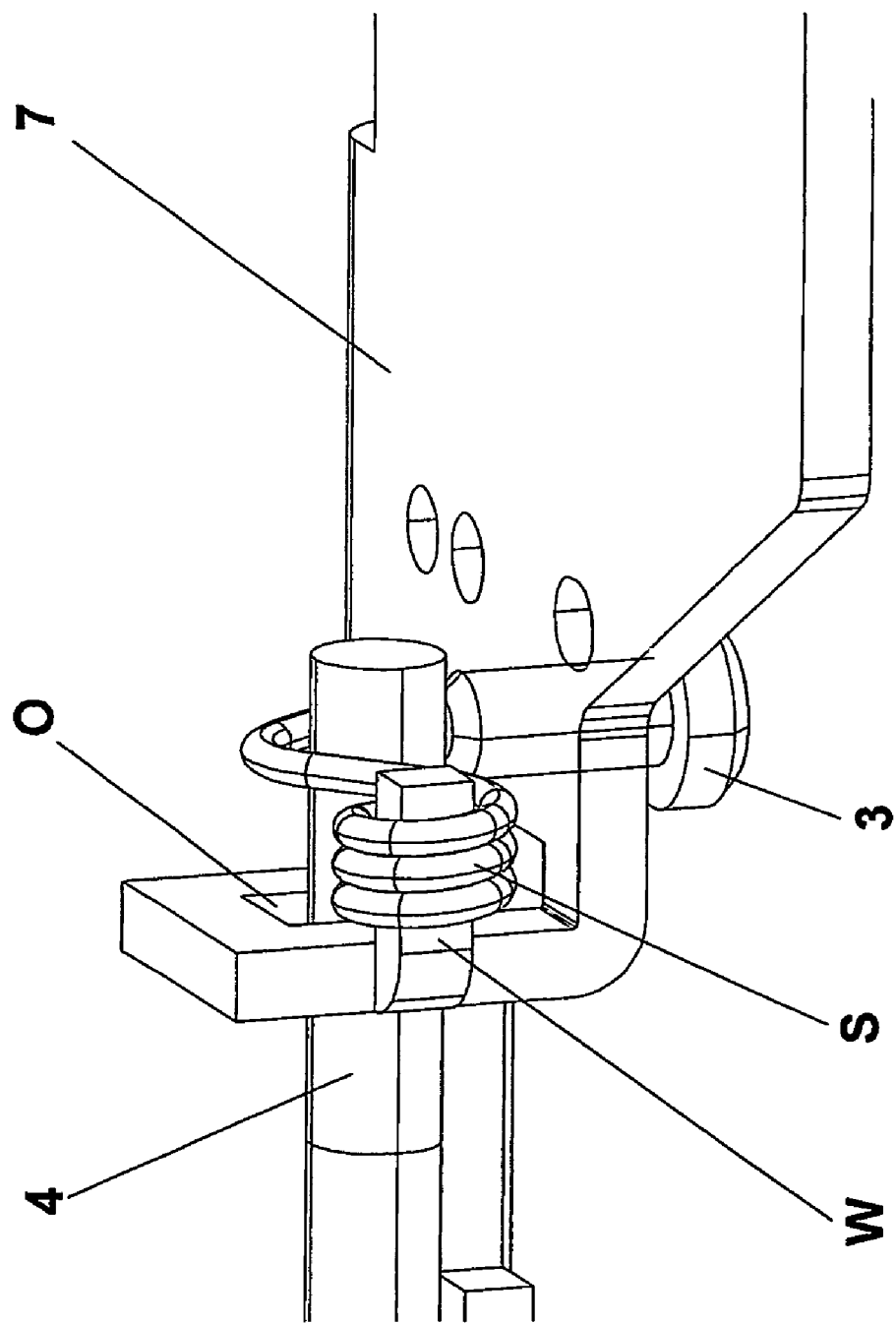
Figure 4:
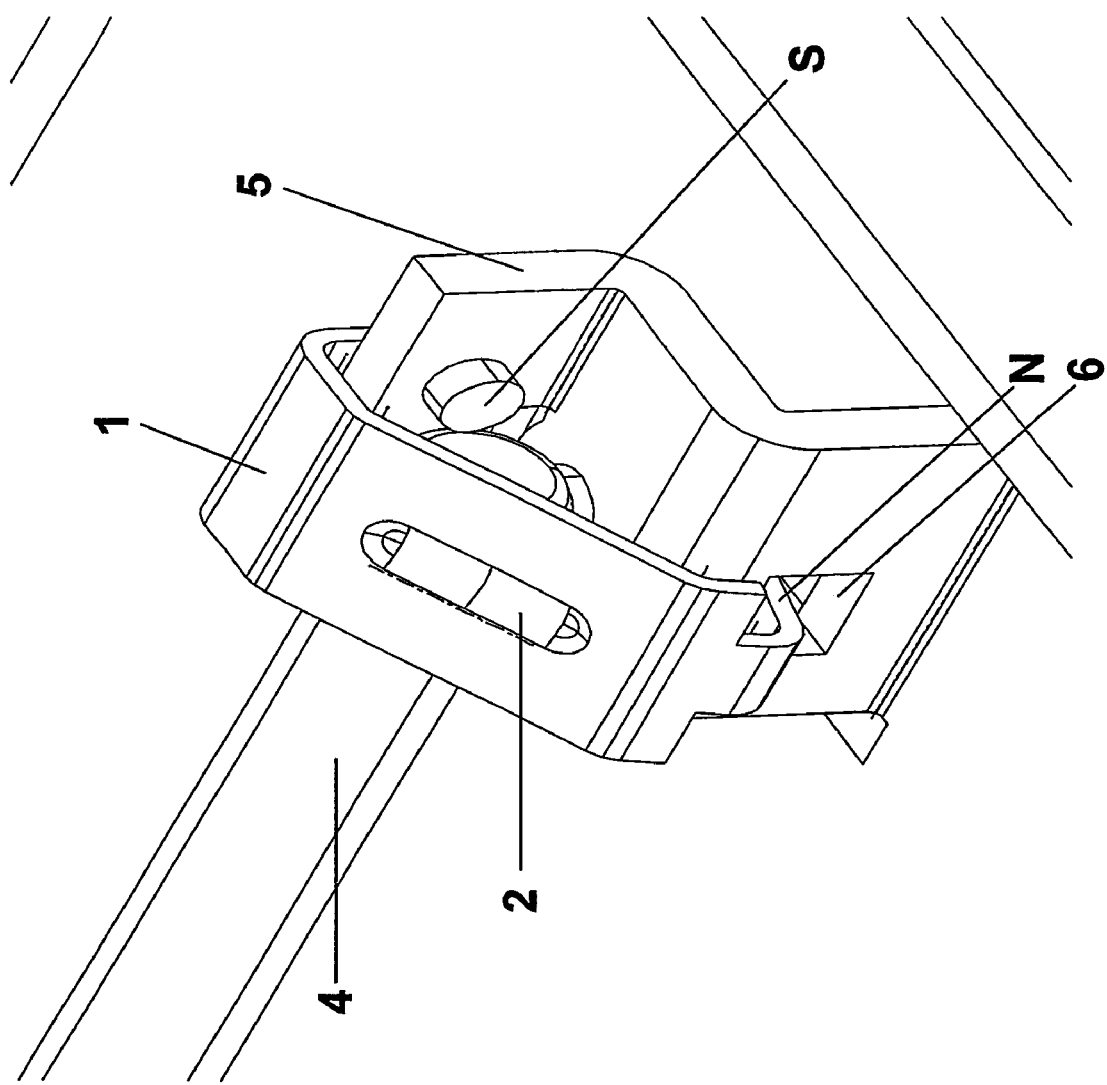
Figure 5:
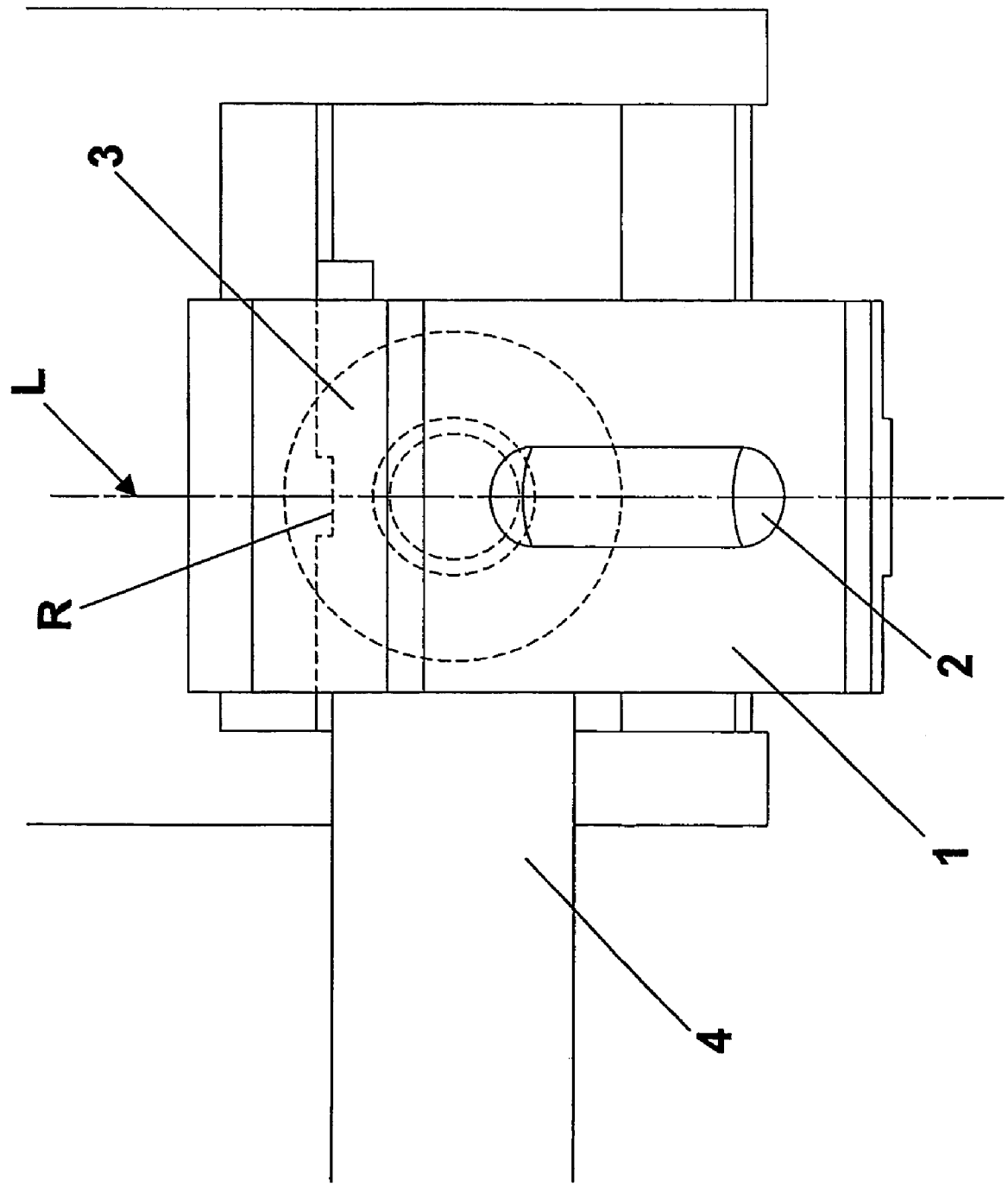
Figure 6:
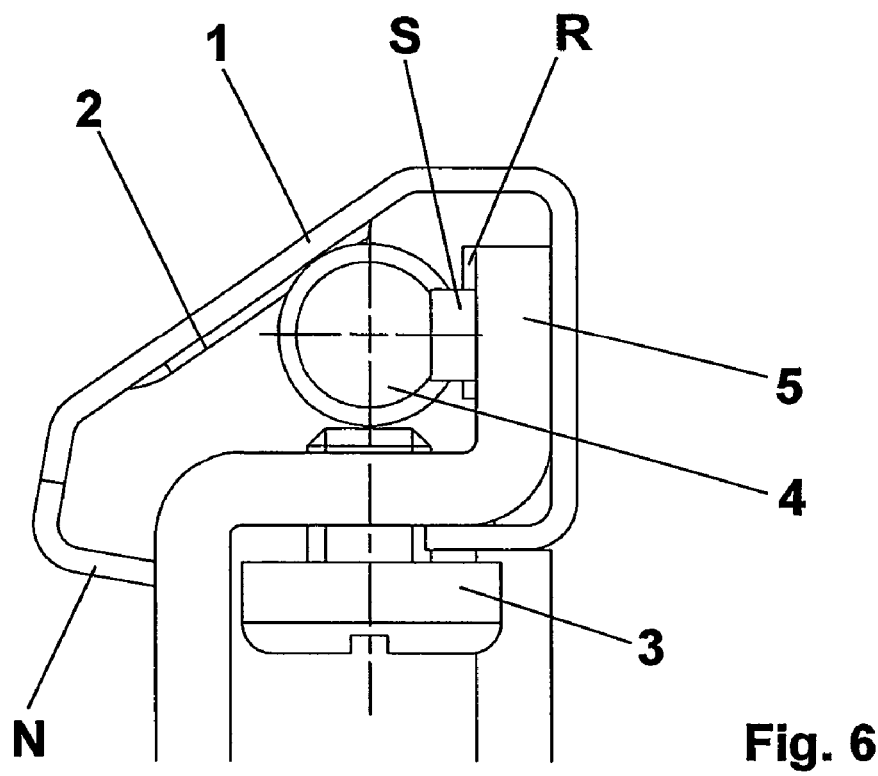
Figure 7:
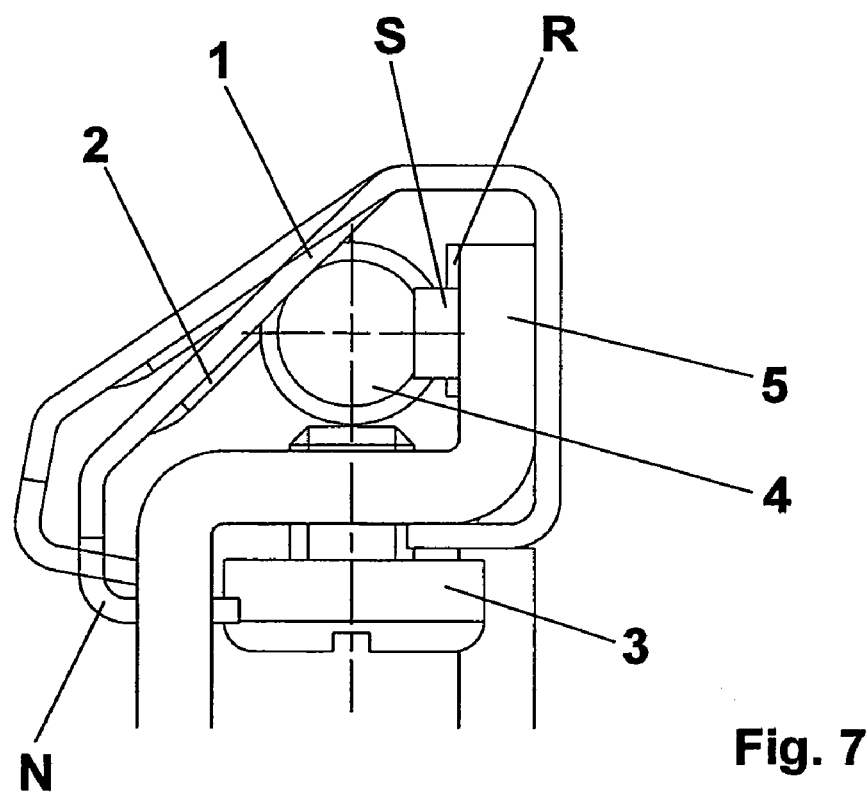
Figure 8:
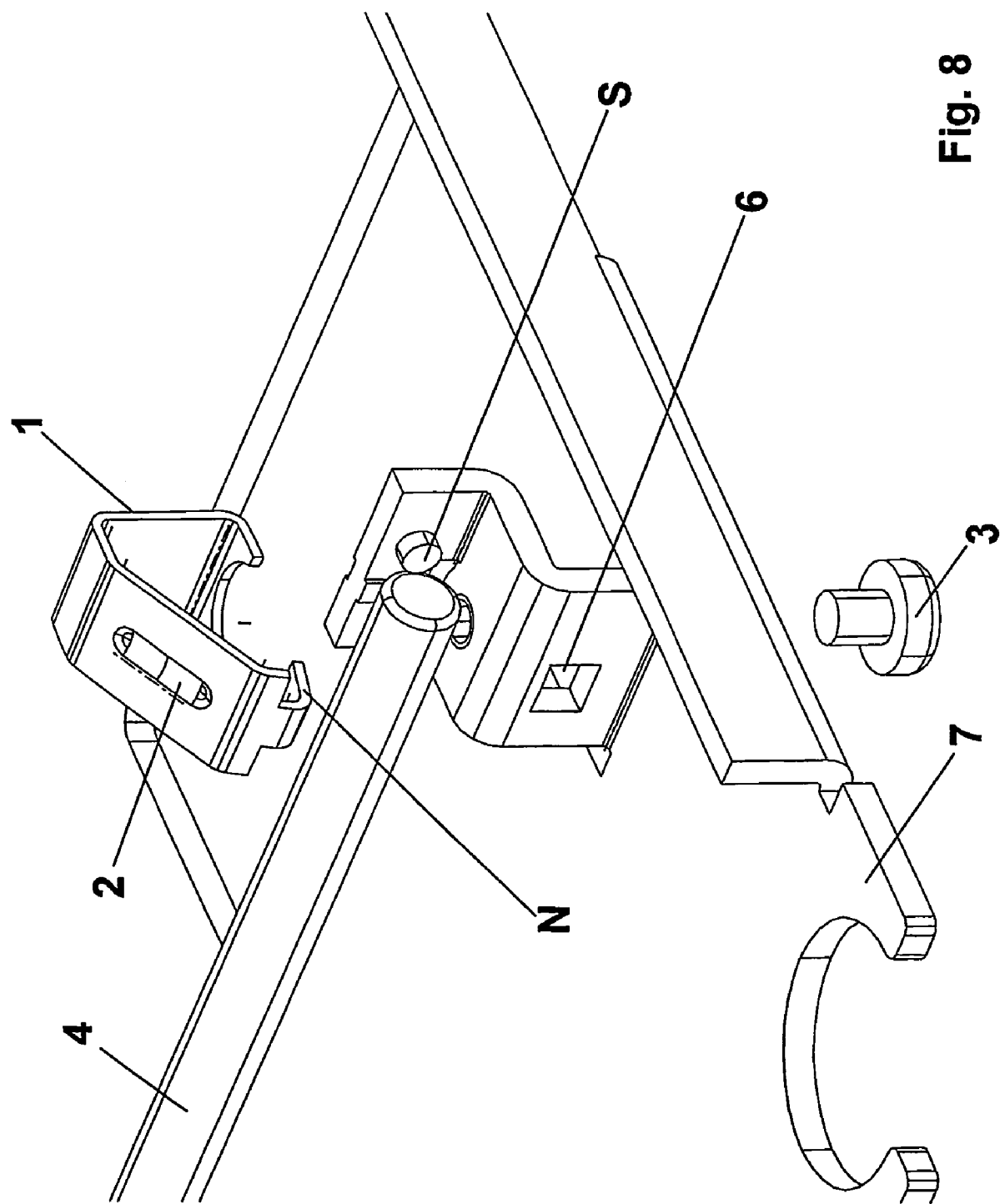
Figure 9:
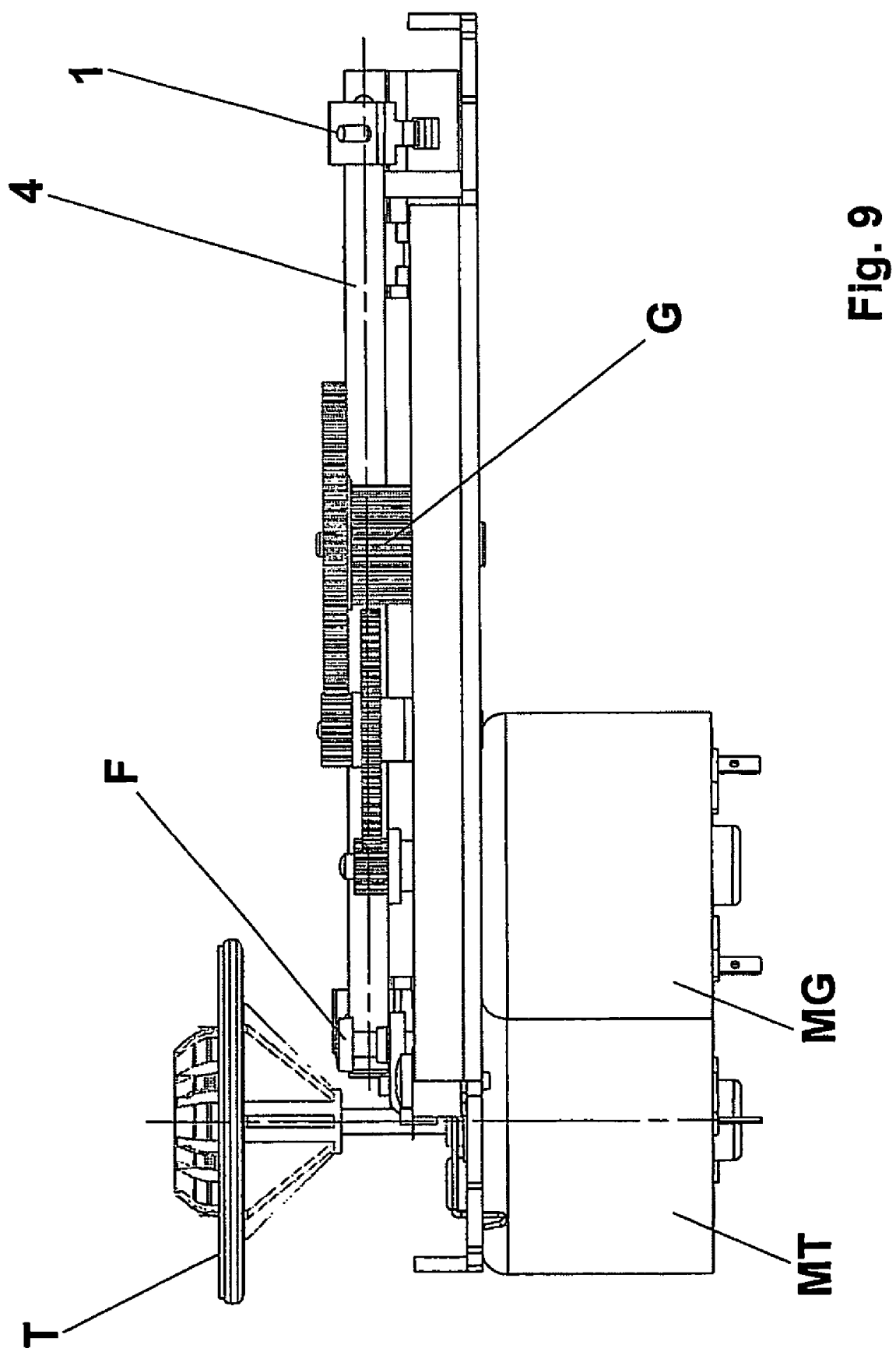

The invention is explained in more detail on the basis of an exemplary embodiment illustrated in the drawings, in which:

FIG. 1 shows a schematic diagram of a fixing and adjusting device according to the invention for a guide rod, FIG. 2 shows a schematic diagram of the side view of an optical scanning device with means according to the invention for parallel orientation of the scanning device with respect to the surface of the recording medium, FIG. 3 shows a schematic diagram of a known fixing and adjusting device for a guide rod, FIG. 4 shows a schematic diagram of a fixing and adjusting device according to the invention for a guide rod in a perspective view, FIG. 5 shows a schematic diagram of the fixing and adjusting device according to the invention for a guide rod in plan view, FIG. 6 shows a schematic diagram of the fixing and adjusting device according to the invention for a guide rod in side view, FIG. 7 shows a schematic diagram of the fixing and adjusting device according to the invention for a guide rod in side view before and after adjustment, FIG. 8 shows a schematic diagram of the fixing and adjusting device according to the invention for a guide rod in an exploded illustration, and FIG. 9 shows a schematic diagram of the guide rod oriented parallel to the surface of the recording medium in the manner according to the invention, in side view.

Reference symbols are used concordantly in the drawings below. FIG. 1 shows the schematic diagram of a guide rod 4, which is held at one end by means of a fixing and adjusting device according to the invention, which comprises a tensioning element 1 having a bead 2, a shaped portion 5 of a baseplate 7 and an adjusting screw 3. The guide rod 4 is provided for guiding a movable slide which, in a recording and/or reproduction apparatus for optical recording media, carries a scanning device P provided for reading from or writing to a recording medium D illustrated in FIG. 2. The scanning device P generates a light or laser beam that has to be oriented perpendicularly onto the recording medium D in order to read or write information. For optical scanning of the recording medium D in its entire recording and/or reproduction region, the scanning device P is arranged on a movable slide that can be shifted parallel to the recording medium D in order to orient the laser beam perpendicularly onto the recording medium D. In order to ensure that the laser beam is oriented perpendicularly onto the recording medium D, provision is made of at least one guide rod 4 that guides the slide or the scanning device P in a parallel manner in the recording and/or reproduction region of the recording medium D. The parallel guidance of the scanning device P has to be provided with high accuracy since even slight deviations adversely affect the recording and/or reproduction on account of the optical scanning and the small dimensions of the information track of the recording medium D. The dimensions of the information track of optical recording media D will be reduced further for a higher information storage density. The optical scanning device P generally has a fine drive and numerous servo regulating circuits for high-precision tracking and focusing of the laser beam and, if appropriate, also for orienting the laser beam perpendicularly onto the recording medium D. However, the fine drive and the servo regulating circuits are provided, in particular, in order to compensate for deviations of the recording medium D, which rotates on a disc turntable T, from a predetermined plane. Deviations with respect to said plane that issue from the guidance of the scanning device P already disadvantageously restrict the regulating range that can be provided for deviations of the recording medium D from the predetermined plane. Recording and/or reproduction apparatuses for optical recording media therefore have adjusting means that are used to set, for the purpose of orienting the scanning beam perpendicularly onto the recording medium D in the entire possible recording and/or reproduction region of the recording medium D, a parallel guidance of the scanning device P with respect to the recording medium D or a parallel orientation of the recording medium D with respect to a plane formed by the range of movement of the scanning device P. For parallel orientation of the recording medium D with respect to a plane formed by the range of movement of the scanning device P, it is also possible to adjust the motor MT carrying the disc turntable T of the recording medium D on its spindle. The motor MT and the guide rod 4 on which the scanning device P is guided are arranged on a baseplate 7 such that corresponding adjustment can be carried out. However, since the distance between the fixing and adjusting means of the motor MT is smaller than the range over which the scanning device P is moved, it is advantageous, for uncomplicated adjustment, to orient or adjust the guide rod 4 or the scanning device P with respect to the recording medium D. Since a fixing and adjusting device for the guide rod 4 is intended to have a small number of individual parts and mounting and adjustment are intended to be made possible with a low outlay, a solution illustrated in FIG. 3 has already been proposed, which essentially comprises a helical spring S that presses the guide rod 4—guided in an opening O—against an adjusting screw 3. The helical spring S is fixed to a web W of the baseplate 7. However, it has emerged and can also be calculated that even a relatively low force of 15 N that acts on the guide rod 4 at a distance of just 3 mm from the clamping location leads to a flexure of the guide rod 4 by 43 μm if a customary guide rod 4 having an effective length of 80 mm and a diameter of 3 mm is used. It is difficult, however, to correct such a deviation in the parallel guidance with the servo control since it is already greater than the minimum permissible distance between the planes in which information is recorded on a DVD. Therefore, in order to utilize the advantage over adjusting the motor MT of the disc turntable T, use is made of fixing and adjusting devices that require a high outlay, comprise a multiplicity of individual parts and receive the guide rod 4 in a stress-free manner.

In order nevertheless to reduce the outlay, the number of individual parts and the mounting outlay, the fixing and adjusting device illustrated in the figures with the exception of FIG. 3 is provided, which is used to orient the scanning device P parallel to the recording medium D. A disadvantageous force transmission issuing from the means required for fixing the guide rod 4 is avoided to the greatest possible extent by means of the fixing and adjusting device illustrated in perspective view in FIG. 4 by virtue of the fact that the fixing and adjusting means are arranged in a line or a plane corresponding to the cross section of the guide rod 4. This line L is specified in FIG. 5 which forms, in the plan view illustrated, the center line of the fixing and adjusting device according to the invention. For this purpose, provision is made of a tensioning element 1 with a bead 2, which is arranged in such a way that the center of its longest extent forms with the center point of the adjusting screw 3 a plane corresponding to the cross section of the guide rod 4.

This leads to a linear fixing of the guide rod 4 by means of which bending forces issuing from the fixing of the guide rod 4 are avoided to the greatest possible extent. The linear orientation of the fixing of guide rod 4 is not altered even during the adjustment of the guide rod 4 for parallel orientation of the scanning device P with respect to the surface of the recording medium D. The guide rod 4 is adjusted by the adjusting screw 3 being correspondingly screwed in or out, a parallel orientation of the guide rod 4 with respect to the surface of the recording medium D being established by means of a collimator in a known manner. The collimator is an optical measuring device that determines the position of an object with respect to a predetermined position, as a result of which it is suitable in particular for adjustment. In principal, however, it is also possible to use all other known means, such as dial gauges, for example, which establish deviations from a predetermined position. The guide rod 4 is then adjusted, as illustrated in FIG. 9, with respect to the surface of the disc turntable T, which later receives the recording medium D.

Screwing the adjusting screw 3 into or out of a threaded hole of the shaped portion 5 of the baseplate 7 raises or lowers the guide rod 4, as a result of which the distance between the guide rod 4 and the surface of the recording medium D is correspondingly reduced or increased. As illustrated in FIGS. 6 and 7, the tensioning element 1 that presses the guide rod 4 resiliently onto the end face of the adjusting screw 3 is extended by screwing in the adjusting screw 3 and fixedly clamps the guide rod 4 on the baseplate 7 or on the shaped portion 5 of the baseplate 7. The shaped portion 5 of the baseplate 7 is provided as an angular piece whose limbs form, with the end face of the adjusting screw 3, which may also be formed in pointed fashion, and with a rib R of the shaped portion 5, bearing or resting areas of the guide rode 4. The rib R is likewise formed in such a way that its center line corresponds to the line L illustrated in FIG. 5, so that a three-point clamping of the guide rod 4 that runs perpendicularly to the guide rod 4 is formed with the bead 2 of the tensioning element 1, the rib R and the adjusting screw 3. The rib R or a bearing area of the guide rod 4 that is formed by a limb of the shaped portion 5 is arranged approximately perpendicular, and the limb of the shaped portion 5 that receives the adjusting screw 3 is arranged approximately parallel, to the surface of the recording medium D, so that a distance directed essentially perpendicular to the recording medium D is set by means of the adjusting screw 3. A tensioning element 1 corresponding to the exemplary embodiment illustrated is produced from a leaf spring and embraces both the guide rod 4 and the shaped portion 5 in clip-like fashion. The tensioning element 1 is formed in desk-like fashion and has a chamfer that carries the bead 2 and is directed both at the rib R and at the end face of the adjusting screw 3. The tensioning element 1 is provided in self-retaining fashion, so that no further fixing elements are necessary, and for this purpose has at one end a lug N engaging into a cutout 6 of the shaped portion 5. The other end of the tensioning element 1 engages behind the angle formed by the limbs of the shaped portion 5. By means of the chamfer of the tensioning element 1 that carries the bead 2, the guide rod 4 is retained both at the rib R and on the end face of the adjusting screw 3. By virtue of the fact that the chamfer of the tensioning element 1 is provided at an angle with respect to the end face of the adjusting screw 3, the lug N of the tensioning element 1 is partly withdrawn from the cutout 6 of the shaped portion 5 when the adjusting screw 3 is screwed in. The exploded illustration of the fixing and adjusting device according to the invention as illustrated in FIG. 8 shows that, besides the adjusting screw 3 that is always necessary, only a tensioning element 1 is necessary in order to fix the guide rod 4 on the shaped portion 5 of the baseplate 7 in an adjustable manner. In order to simplify the orientation of the guide rod 4 in its longitudinal direction, a mandrel S formed by the shaped portion 5 is additionally provided. The fixing and adjusting arrangement is provided at least once at that end of the guide rod 4 which is the furthest away from the spindle of the disc turntable T. The other end of the guide rod 4 is fixed in a known manner by means of a fixing screw F on the baseplate 7, as illustrated in FIG. 1. Furthermore, the illustration shows a gear mechanism G that is used to move the scanning device P, as illustrated in FIG. 2, in a manner driven by a motor MG.

The embodiment described here is specified only as an example and a person skilled in the art can realize other embodiments of the invention which remain within the scope of the invention since the tensioning element could also be formed from a spring wire, for example.

The invention claimed is:

1. A recording or reproduction apparatus for optical recording media
    with means for parallel orientation of the scanning device with respect to the surface of the recording medium, wherein a tensioning element is provided, by means of which a guide rod of the scanning device in an adjustable manner in a plane corresponding to the cross section of the guide rod is fixed on a base plate in order to avoid a force transmission leading to bending the guide rod,
    wherein the tensioning element is embodied with a lug engaging into a cutout of a shaped portion of the baseplate and as a spring element enclosing the shaped portion, said spring element being self-retaining.

2. The recording or reproduction apparatus as claimed in claim 1, wherein an adjusting screw is provided for adjusting the guide rod, which adjusting screw is arranged In a shaped portion of the baseplate and on the end face of which adjusting screw is fixed the guide rod, for parallel orientation of the scanning device with respect to the surface of the recording medium or with respect to the surface of a disc turntable that receives the recording medium, by means of the tensioning element.

3. The recording or reproduction apparatus as claimed in claim 1, wherein the tensioning element is a spring element which is shaped in desk-like fashion and whose chamfer fixes the guide rod on the end face of the adjusting screw in an adjustable manner.

4. The recording or reproduction apparatus as claimed in claim 1, wherein the fixing of the guide rod by means of the tensioning element in a plane corresponding to the cross section of the guide rod is provided as a three-point fixing at the periphery of the guide rod.

5. The recording or reproduction apparatus as claimed in claim 1, wherein a shaped portion having two limbs arranged at an angle to one another is provided on the baseplate, on which limbs the guide rod is fixed in an adjustable manner by means of the tensioning element.

6. A recording or reproduction apparatus for optical recording media
    with means for parallel orientation of the scanning device with respect to the surface of the recording medium, wherein a tensioning element is provided, by means of which a guide rod of the scanning device in an adjustable manner in a plane corresponding to the cross section of the guide rod is fixed on a base plate in order to avoid a force transmission leading to bending the guide rod, wherein the tensioning element has a bead provided for a linear fixing of the guide rod on a shaped portion and the guide rod can be adjusted by means of an adjusting screw at an angle to the linear fixing of the guide rod.

7. The recording or reproductIon apparatus as claimed in claim 6, wherein the tensioning element is a desk-like spring element whose chamfer arranges the guide rod on a shaped portion of the baseplate, In which an adjusting screw is arranged, in an adjustable manner by wrapping around the shaped portion.

8. A recording or reproduction apparatus for optical recording media with means for parallel orientation of the scanning device with respect to the surface of the recording medium, wherein a tensioning element is provided, by means of which a guide rod of the scanning device in an adjustable manner in a plane corresponding to the cross section of the guide rod is fixed on a base plate in order to avoid a force transmission leading to bending the guide rod, wherein a shaped portion having two limbs arranged at an angle to one another is provided on the baseplate, of which limbs one limb receives, in a threaded hole, an adjusting screw for parallel orientation of the guide rod with respect to a surface of the recording medium, and the other limb has a rib and the tensioning element fixes the guide rod in an adjustable manner with the end face of the adjusting screw and in a manner bearing on the rib of the limb of the shaped portion of the baseplate.

9. The recording or reproduction apparatus as claimed in claim 8, wherein the center of the end face of the adjusting screw, the rib of the limb of the shaped portion of the baseplate and a bead of the tensioning element are arranged in a plane corresponding to the cross section of the guide rod.

* * * * *